(12) United States Patent
Wallman et al.

(10) Patent No.: US 6,964,033 B2
(45) Date of Patent: Nov. 8, 2005

(54) OBJECT BAND CUSTOMIZATION OF JAVA RUNTIME ENVIRONMENTS

(75) Inventors: David Wallman, Sunnyvale, CA (US); Stepan Sokolov, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 475 days.

(21) Appl. No.: 09/886,440

(22) Filed: Jun. 20, 2001

(65) Prior Publication Data

US 2003/0018959 A1 Jan. 23, 2003

(51) Int. Cl.⁷ .................................................. G06F 9/44
(52) U.S. Cl. .......................... 717/118; 717/116; 717/148
(58) Field of Search ................................ 717/100, 108, 717/114–116, 118, 148, 165–166, 151

(56) References Cited

U.S. PATENT DOCUMENTS

| | | | | |
|---|---|---|---|---|
| 5,848,274 A | * | 12/1998 | Hamby et al. ............... | 717/153 |
| 5,893,118 A | | 4/1999 | Sonderegger | |
| 6,061,743 A | | 5/2000 | Thatcher et al. | |
| 6,083,279 A | | 7/2000 | Cuomo et al. | |
| 6,158,048 A | * | 12/2000 | Lueh et al. .................. | 717/118 |
| 6,209,018 B1 | * | 3/2001 | Ben-Shachar et al. ...... | 718/105 |
| 6,237,135 B1 | * | 5/2001 | Timbol ........................ | 717/107 |
| 6,295,638 B1 | | 9/2001 | Brown et al. | |
| 6,330,709 B1 | * | 12/2001 | Johnson et al. ............. | 717/100 |
| 6,336,213 B1 | | 1/2002 | Beadle et al. | |
| 6,339,841 B1 | | 1/2002 | Merrick et al. | |
| 6,385,769 B1 | * | 5/2002 | Lewallen .................... | 717/125 |
| 6,412,107 B1 | | 6/2002 | Cyran et al. | |
| 6,429,860 B1 | | 8/2002 | Hughes | |
| 6,442,558 B1 | | 8/2002 | Brown et al. | |
| 6,446,254 B1 | * | 9/2002 | Chapman et al. ........... | 717/116 |
| 6,453,342 B1 | | 9/2002 | Himmel et al. | |
| 6,463,578 B1 | * | 10/2002 | Johnson ....................... | 717/124 |
| 6,510,551 B1 | * | 1/2003 | Miller ......................... | 717/114 |
| 6,523,168 B1 | * | 2/2003 | Arnold et al. .............. | 717/116 |
| 6,581,077 B2 | * | 6/2003 | Sokolov et al. ............. | 707/206 |
| 6,584,612 B1 | | 6/2003 | Mueller et al. | |
| 6,658,573 B1 | * | 12/2003 | Bischof et al. ............. | 713/201 |
| 6,675,371 B1 | * | 1/2004 | York et al. ................. | 717/114 |
| 6,704,746 B2 | * | 3/2004 | Sokolov et al. ......... | 707/103 R |
| 6,704,927 B1 | * | 3/2004 | Bak et al. ................... | 717/151 |
| 6,721,740 B1 | * | 4/2004 | Skinner et al. ............ | 707/10 |
| 6,742,109 B2 | * | 5/2004 | Sokolov et al. ............. | 712/210 |
| 6,769,015 B1 | | 7/2004 | Bates et al. | |
| 2002/0087589 A1 | | 7/2002 | Wallman | |
| 2004/0172619 A1 | | 9/2004 | Woolen et al. | |

FOREIGN PATENT DOCUMENTS

| | | |
|---|---|---|
| EP | 1076301 A2 | 2/2001 |
| EP | 1124183 A1 | 8/2001 |
| WO | WO03/104980 A2 | 12/2003 |

OTHER PUBLICATIONS

Pominville et al, "A frameowrk for optimizing java using attributes", Proc. of the 2000 ocnf. of the center of advance studies on collabortaive resh, Nov. 2000, pp 1–17.*

(Continued)

*Primary Examiner*—Anil Khatri
(74) *Attorney, Agent, or Firm*—Beyer Weaver & Thomas, LLP

(57) ABSTRACT

Techniques for customization of Java runtime environments are disclosed. The techniques can be used to provide Java runtime environments that are specifically tailored for various Java applications. Accordingly, for a particular Java application, an optimized runtime environment can be created. One or more optional attributes which represent the desired runtime customizations are generated. As will be appreciated, the optional attributes can be generated in the attribute table in the class file. The optional attributes can then be parsed and appropriate features can be loaded into the virtual machine. In this way, Java runtime environments can be customized based on a particular Java application requirement. Moreover, customizations can be automated using a runtime performance manager that interacts with various other components that operate to first generate and then load optional attributes into the Java runtime environment.

18 Claims, 6 Drawing Sheets

OTHER PUBLICATIONS

Krintz et al, "Reducing transfer delay using java class file splitting and prefetching", ACM OOPSLA, pp 276–291.*

Kazi et al, "Techniques for obtaining high performance in ava programs", ACM Computing Surevys, vol. 32, No. 3, Sep. 2000, pp 213–240.*

Benton et al, "Compiling standard ML to java bytecodes", ACM ICFP, pp 129–140, 1998.*

Alpern et al, "Implementing Jalapeno in Java", ACM OOPSLA, pp 314–324.*

Stephenson et al, "A quantitative analysis of the perfromance impact of specialized bytecodes in Java", Proc. of the 2004 conference of the enter for advance studies on collaborative Resh, Oct. 2004, pp 267–281.*

Sun Microsystems: "Java Card 2.1.1 Virtual Machine Specification" May 18, 2000, XP002290969.

INFO–ZIP: "INFO–ZIP application note" Mar. 11, 1997, XP002290913.

TIS COMMITTEE: "Executable and linking format (ELF) specification" May 1995, XP002290914.

Hummel, Joseph et al., "Annotating the Java bytecodes in support of optimization", 1997, *Concurrency: Practice and Experience*, vol. 9, No. 11, pp. 1003–1016. XP–001131083.

Pominville, Patrice, "Annotating Java Bytecode", 2000, *McGill University, 308–621 Optimizing Compilers, Project Report*, pp. 1–7. XP–002252576.

Lindholm et al, "The Java™ Virtual Machine Specification", (Sep., 1996), Sun Microsystems, Inc., Chapters 1–10 (173 pp.).

* cited by examiner

OBJECT BAND CUSTOMIZATION OF JAVA RUNTIME ENVIRONMENTS

CROSS-REFERENCE TO RELATED APPLICATIONS

This application is related to U.S. patent application Ser. No. 09/886,178, entitled "OPTIONAL ATTRIBUTE GENERATOR FOR CUSTOMIZED JAVA PROGRAMMING ENVIRONMENTS", filed concurrently herewith, and hereby incorporated herein by reference.

This application is also related to U.S. patent application Ser. No. 09/852,463, entitled "FRAMEWORKS FOR ACCESSING JAVA CLASS FILES", filed May 9, 2001, and hereby incorporated herein by reference.

BACKGROUND OF THE INVENTION

The present invention relates generally to object-based high level programming environments, and more particularly, to techniques suitable for customization of a Java runtime environment.

One of the goals of high level languages is to provide a portable programming environment such that the computer programs may easily be ported to another computer platform. High level languages such as "C" provide a level of abstraction from the underlying computer architecture and their success is well evidenced from the fact that most computer applications are now written in a high level language.

Portability has been taken to new heights with the advent of the World Wide Web ("the Web") which is an interface protocol for the Internet which allows communication between diverse computer platforms through a graphical interface. Computers communicating over the Web are able to download and execute small applications called applets. Given that applets may be executed on a diverse assortment of computer platforms, the applets are typically executed by a Java™ virtual machine.

Recently, the Java programming environment has become quite popular. The Java programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation. The Java virtual machine is commonly implemented in software by means of an interpreter for the Java virtual machine instruction set but, in general, may be software, hardware, or both. A particular Java virtual machine implementation and corresponding support libraries together constitute a Java runtime environment.

Computer programs in the Java programming language are arranged in one or more classes or interfaces (referred to herein jointly as classes or class files). Such programs are generally platform, i.e., hardware and operating system, independent. As such, these computer programs may be executed without modification on any computer that is able to run an implementation of the Java runtime environment.

Object-oriented classes written in the Java programming language are compiled to a particular binary format called the "class file format." The class file includes various components associated with a single class. These components can be, for example, methods and/or interfaces associated with the class. In addition, the class file format can include a significant amount of ancillary information that is associated with the class. The class file format (as well as the general operation of the Java virtual machine) is described in some detail in *The Java Virtual Machine Specification, Second Edition*, by Tim Lindholm and Frank Yellin, which is hereby incorporated herein by reference.

FIG. 1A shows a progression of a simple piece of a Java source code 101 through execution by an interpreter, the Java virtual machine. The Java source code 101 includes the classic Hello World program written in Java. The source code is then input into a Bytecode compiler 103 that compiles the source code into Bytecodes. The Bytecodes are virtual machine instructions as they will be executed by a software emulated computer. Typically, virtual machine instructions are generic (i.e., not designed for any specific microprocessor or computer architecture) but this is not required. The Bytecode compiler outputs a Java class file 105 that includes the Bytecodes for the Java program. The Java class file is input into a Java virtual machine 107. The Java virtual machine is an interpreter that decodes and executes the Bytecodes in the Java class file. The Java virtual machine is an interpreter, but is commonly referred to as a virtual machine as it emulates a microprocessor or computer architecture in software (e.g., the microprocessor or computer architecture may not exist in hardware).

FIG. 1B illustrates a simplified class file 100. As shown in FIG. 1B, the class file 100 includes a constant pool 102 portion, interfaces portion 104, fields portion 106, methods portion 108, and attributes portion 110. The attributes (or attributes table) 110 portion represents the attributes associated with the class file 100. This allows for one or more attributes to be defined, each of which can be associated with one or more components of the class file. As is known to those skilled in the art, the Java virtual machine implementations are allowed to define and use various attributes. In addition, the virtual machine's implementations ignore attributes that they do not recognize. Thus, a class file may contain one or more attributes, all or none of which may be recognized by a particular virtual machine implementation.

As is known to those skilled in the art, execution of a Java application typically requires various Java features to be available at runtime. Unfortunately, however, one problem with conventional virtual machine implementation is that typically most of the available features are loaded regardless of whether they are going to be used at runtime by a particular Java application. This, of course, can result in a grossly inefficient use of system resources. In some circumstances, particularly in systems with limited computing power and/or memory, this inefficient use of resources is a serious disadvantage. As such, it is highly desirable to customize Java runtime environments so as to optimize performance of Java applications.

Accordingly, there is a need for techniques that allow customization of Java runtime environment of virtual machines that operate with limited computing power and/or memory (e.g., embedded systems).

SUMMARY OF THE INVENTION

The present invention pertains to improved techniques for customization of Java runtime environments. The techniques can be used to provide Java runtime environments that are specifically tailored for various Java applications. Accordingly, for a particular Java application, an optimized runtime environment can be created. In accordance with one aspect of the invention, one or more optional attributes which represent the desired runtime customizations are generated. As will be appreciated, the optional attributes can be generated in the attribute table in the class file. The optional attributes can then be parsed and appropriate features can be loaded into the virtual machine. In this way, Java runtime environments can be customized based on a particular Java application requirement. Moreover, customizations can be automated using a runtime performance manager that interacts with various other components that operate to first generate and then load optional attributes into the Java runtime environment.

The invention can be implemented in numerous ways, including as a method, an apparatus, a computer readable medium, and a database system. Several embodiments of the invention are discussed below.

As a method for customizing a Java runtime environment for a Java application suitable for execution by a virtual machine, one embodiment of the invention includes the acts of: marking one or more Java Bytecodes associated with a Java class file; generating at least one attribute for the one or more marked Java Bytecodes; and loading at least one feature of Java runtime into the virtual machine based on the at least one attribute.

One embodiment of the invention includes a Java computing environment suitable for execution of a Java application in a Java virtual machine. The Java computing environment includes a first software module suitable for marking one or more Java Bytecodes associated with a Java class file; a second software module suitable for generating at least one attribute for the one or more marked Java Bytecodes; and a third software module suitable for loading at least one feature of Java runtime into the virtual machine based on the at least one attribute.

As a computer readable media including computer program code for customizing a Java runtime environment, one embodiment of the invention includes computer program code for marking one or more Java Bytecodes associated with a Java class file; computer program code for generating at least one attribute for the one or more marked Java Bytecodes; and computer program code for loading at least one feature of Java runtime into the virtual machine based on the at least one attribute.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The present invention pertains to improved techniques for customization of Java runtime environments. The techniques can be used to provide Java runtime environments that are specifically tailored for various Java applications. Accordingly, for a particular Java application, an optimized runtime environment can be created. In accordance with one aspect of the invention, one or more optional attributes which represent the desired runtime customizations are generated. As will be appreciated, the optional attributes can be generated in the attribute table in the class file. The optional attributes can then be parsed and appropriate features can be loaded into the virtual machine. In this way, Java runtime environments can be customized based on a particular Java application requirement. Moreover, customizations can be automated using a runtime performance manager that interacts with various other components that operate to first generate and then load optional attributes into the Java runtime environment.

One component is an optional attribute generator that operates to generate optional attributes that represent desired optimizations for a Java runtime environment. The optional attribute generator can, among other things, generate programming code that implements an Application Programming Interface (API) suitable for accessing the optional attributes that are stored in the Java class file. In addition, the optional attribute generator can perform a variety of other tasks, for example, it can access a database to receive optimizations as input and update the database after the optional attributes are generated.

Embodiments of the invention are discussed below with reference to FIGS. 2–5. However, those skilled in the art will readily appreciate that the detailed description given herein with respect to these figures is for explanatory purposes only as the invention extends beyond these limited embodiments.

Figure 1A:
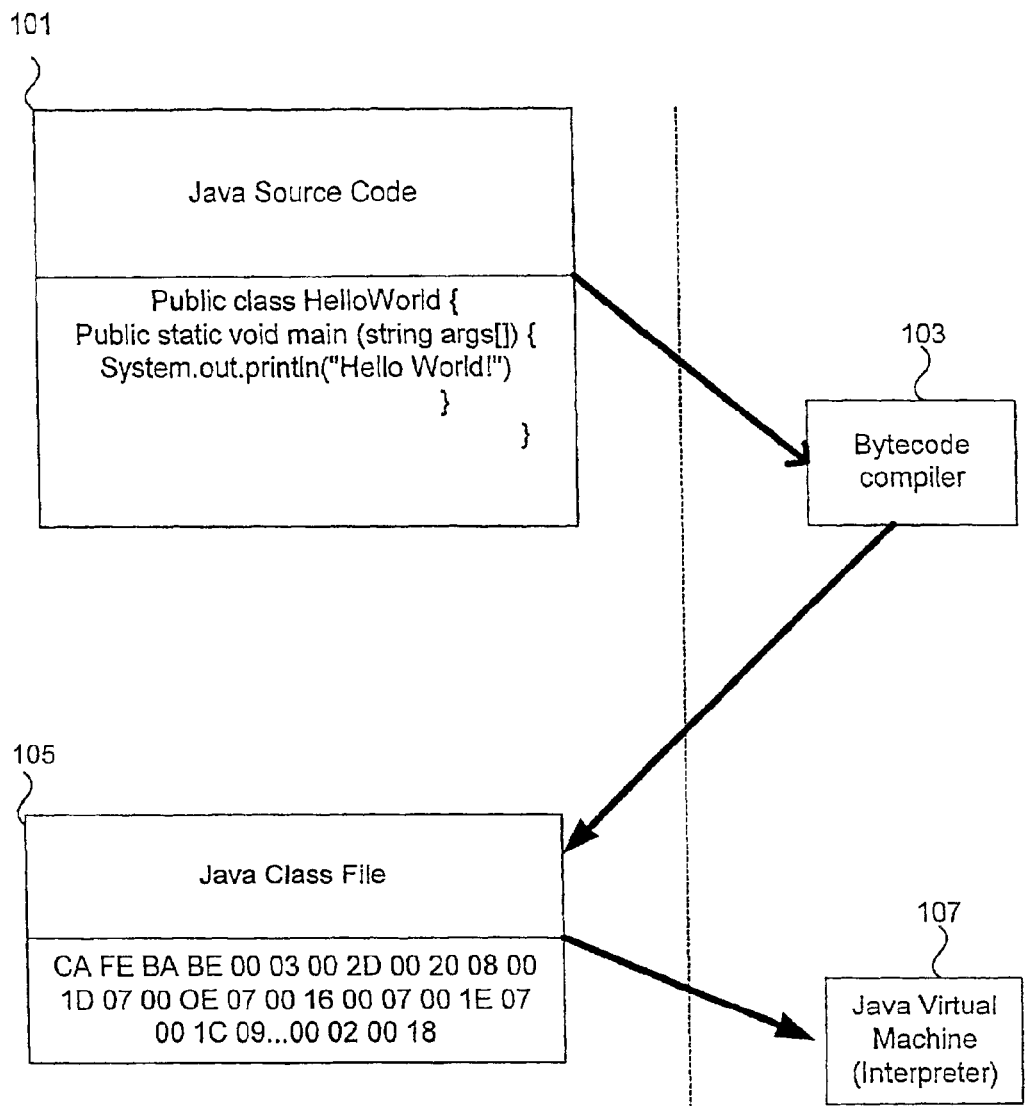
FIG. 1A shows a progression of a simple piece of a Java source code through execution by an interpreter, the Java virtual machine.
Figure 1B:
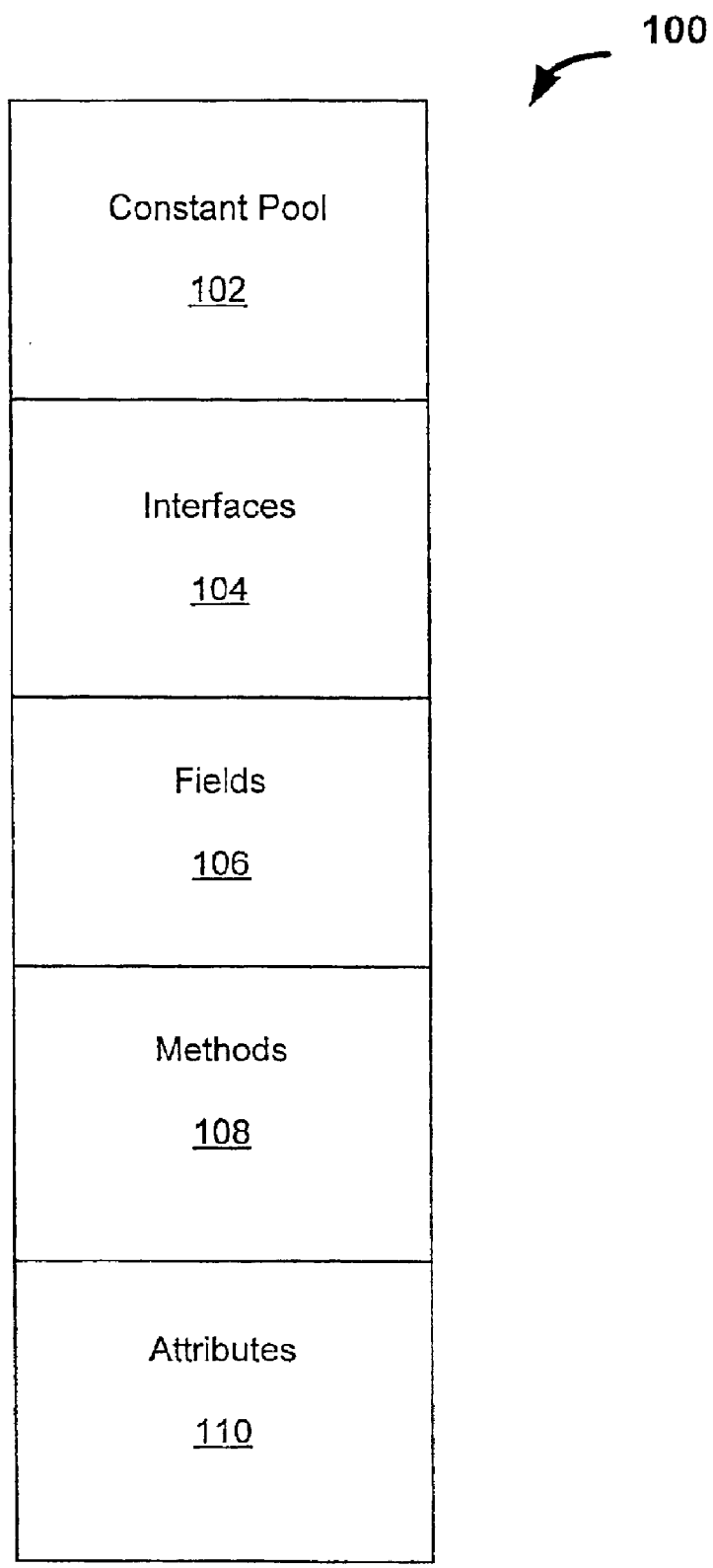
FIG. 1B illustrates a simplified class file.
Figure 2:
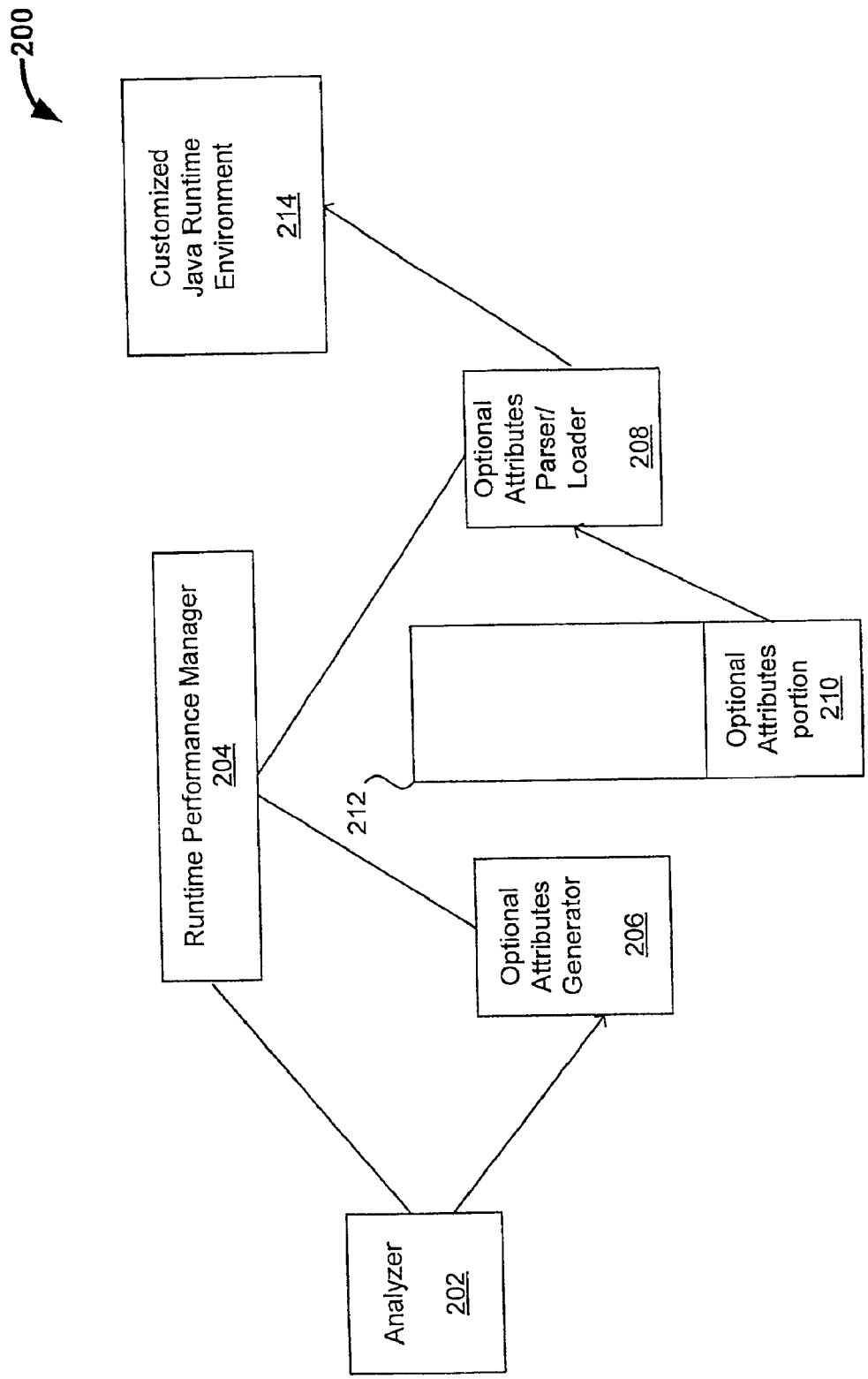
FIG. 2 illustrates a Java computing environment in accordance with one embodiment of the invention.

FIG. 2 illustrates a Java computing environment 200 in accordance with one embodiment of the invention. The Java computing environment 200 includes an analyzer 202, a runtime performance manager 204, an optional attributes generator 206, an optional attributes parser/loader 208, and an optional attributes portion 210 implemented in the attributes table portion of a class file 212. As will be appreciated, these components provide a customized Java runtime environment 214 that is customized for a particular Java application.

The analyzer 202 can serve as a front-end and perform various tasks associated with profiling the Java application. As such, the analyzer 202 can be a compiler extension or tool suitable for analyzing a Java application. In any case, the analyzer 202 can operate to mark various Java Bytecodes (e.g., Bytecodes of a Java method). The marked Bytecodes typically represent Java Bytecodes that are associated with Java objects that are of interest for a particular application (e.g., Bytecode instructions that create objects that remain active during the execution of the Java application, and have a particular size, class, etc.)

Based on the analysis performed by the analyzer 202, the optional attributes generator 206 generates the optional attributes portion 210. As will be appreciated, the optional attributes portion 210 can be implemented in the attributes portion of the class file 212. The optional attributes can, for example, be implemented in accordance with the invention described in the Patent Application entitled "FRAMEWORKS FOR ACCESSING JAVA CLASS FILES", filed May 9, 2001, and hereby incorporated herein by reference.

The optional attributes parser/loader 208 can, in turn, parse and load the optional attributes 210 generated by the optional attributes generator 206. As will be appreciated, the optional attributes 210 can be used to indicate how to customize the Java runtime environment for a particular application. By way of example, the optional attributes 210 may indicate which features of the Java runtime environment need to be loaded (i.e., only marked features will be loaded). As another example, the optional attributes 210 may indicate that some Java objects require special treatment at runtime (e.g., objects that remain active throughout the execution of the Java application may be allocated in a particular portion of the memory).

Thus, through the use of optional attributes, the Java runtime environment 214 can be customized to meet the needs of a particular application. In addition, the customization of the Java runtime environment can be automated. To achieve automation, the runtime performance manager is provided. The runtime performance manager 204 can interact with the optional attributes generator 206 and optional attributes parser/loader 208 to ensure that attributes are correctly generated and/or features need are loaded. In other words, the runtime performance manager 204, among other things, ensures that the appropriate runtime environment is created (e.g., the required Java features are provided in the runtime environment, additional features are provided so that marked Java objects can be treated as desired).

Figure 3:
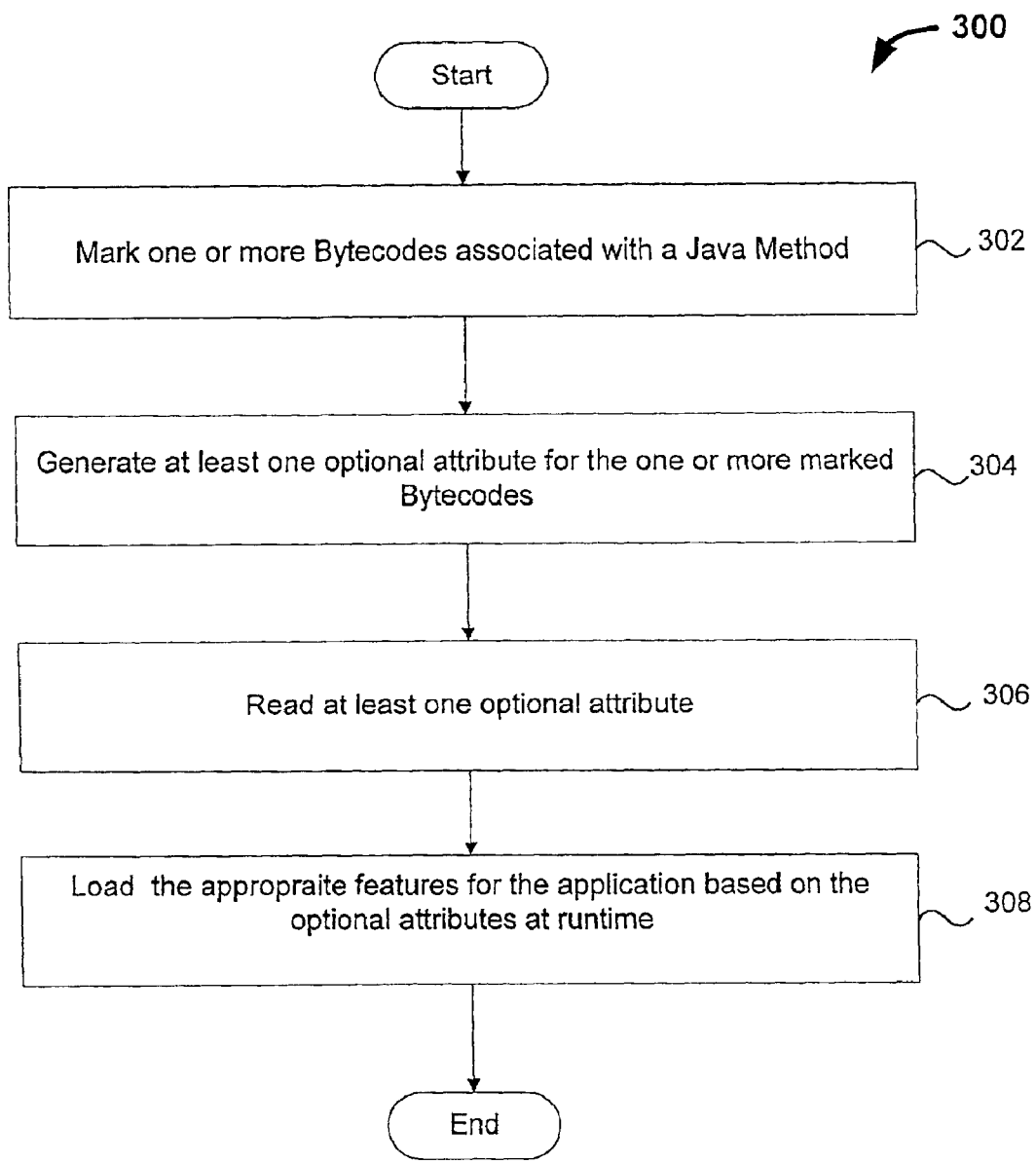
FIG. 3 illustrates a method for customizing Java runtime environments in accordance with one embodiment of the invention.

FIG. 3 illustrates a method for customizing Java runtime environments in accordance with one embodiment of the invention. Initially, at operation 302, one or more Bytecodes associated with a Java method are marked. The marked Bytecodes typically represent instructions that are associated with Java objects that are of interest for a particular application. As noted above, the marking of the Bytecodes can be performed by a compiler extension or a tool suitable for analyzing a Java application (e.g., analyzer 202 of FIG. 2). Next, at operation 304, at least one optional attribute is created for the one or more marked Bytecodes. The at least one optional attribute can be created by an optional attributes generator, for example, the optional attributes generator 206 of FIG. 2. The optional generator 206 can generate optional attributes based on the input received from an analyzer and/or runtime performance manager (e.g., runtime performance manager 204 of FIG. 2). It should be noted that the optional attributes are typically created in the attributes table portion of the class file.

After creation of the at least one optional attribute, the method 300 proceeds to operation 306 where the at least one optional attribute is read. The at least one optional attribute can be read by an optional attributes parser/loader (e.g., attributes parser/loader 208 of FIG. 2). The attributes parser/loader operates to extract the optional attributes from the class file. Thereafter, at operation 308, appropriate features for the application are loaded based on the optional attributes. In other words, the Java runtime environment is customized for a particular application based on the optional attributes that were read.

As will be appreciated, the loading of the appropriate features can be performed at runtime. Furthermore, this loading can be monitored and/or at least partially performed by a runtime performance manager which can interact with the optional attributes generator and the optional attributes parser/loader.

Figure 4:
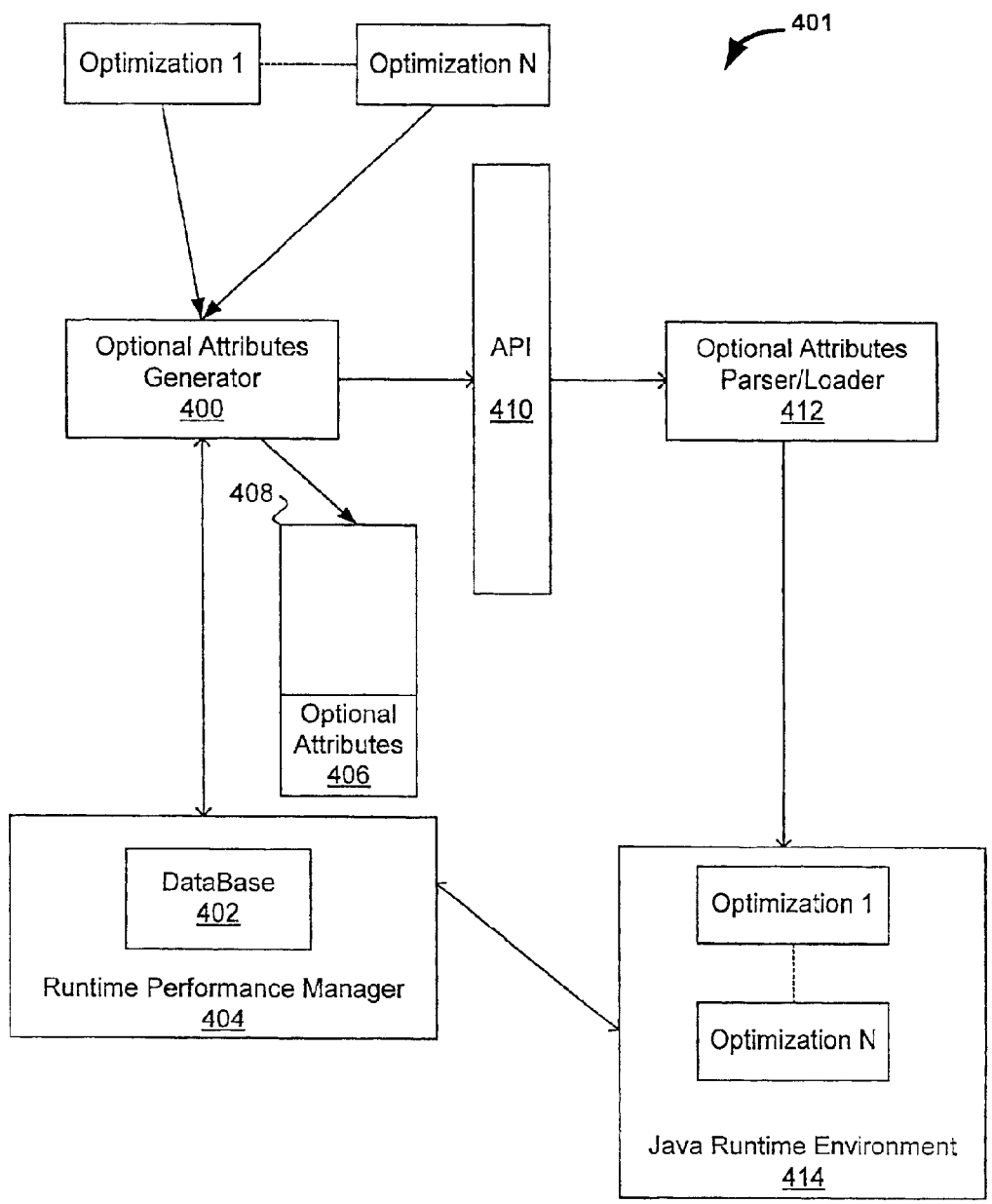
FIG. 4 illustrates an optional attributes generator operating in a Java computing environment in accordance with one embodiment of the invention.

FIG. 4 illustrates an optional attributes generator 400 operating in a Java computing environment 401 in accordance with one embodiment of the invention. The optional attributes generator 401 receives as input optimizations 1–N, which represent one or more desired optimizations of the Java runtime environment. These optimizations can, for example, be Java runtime features that need to be loaded for a particular Java application. The optimizations can also represent special runtime operations that are to be performed on some objects of a Java application.

It should also be noted that optimizations 1–N can be generated by an analyzer (not shown) and/or be stored in a database 402 of a runtime performance manager 404. In any case, based on the optimizations 1–N, the optional attribute generator 401 generates optional attributes 406 in a class file 408. In addition, the optional attribute generator 401 generates an Application Programming Interface (API) 410 that can be used as an interface to an optional attributes parser/loader 412. In one embodiment, the optional attribute generator 401 generates the Application Programming Interface (API) 410 in C programming language. As such, the Application Programming Interface (API) 410 includes functions suitable for performing various operations on the optional attributes 406 of the class file 408 (e.g., read the first optional attribute, get the next optional attribute, get the last optional attribute, find a particular attribute, etc.)

As noted above, the optional attributes parser/loader 412 in conjunction with the runtime performance manger can customize the Java runtime environment 414. In other words, the Java runtime environment 414 is customized so as to provide the optimizations 1–N. It should be noted that the optional attributes generator 401 can update the database 402. In addition, the optional attributes generator 401 can optionally perform a variety of other tasks. These tasks include generation of a description of attributes, for example, in Extensible Markup Language (XML) format.

Figure 5:
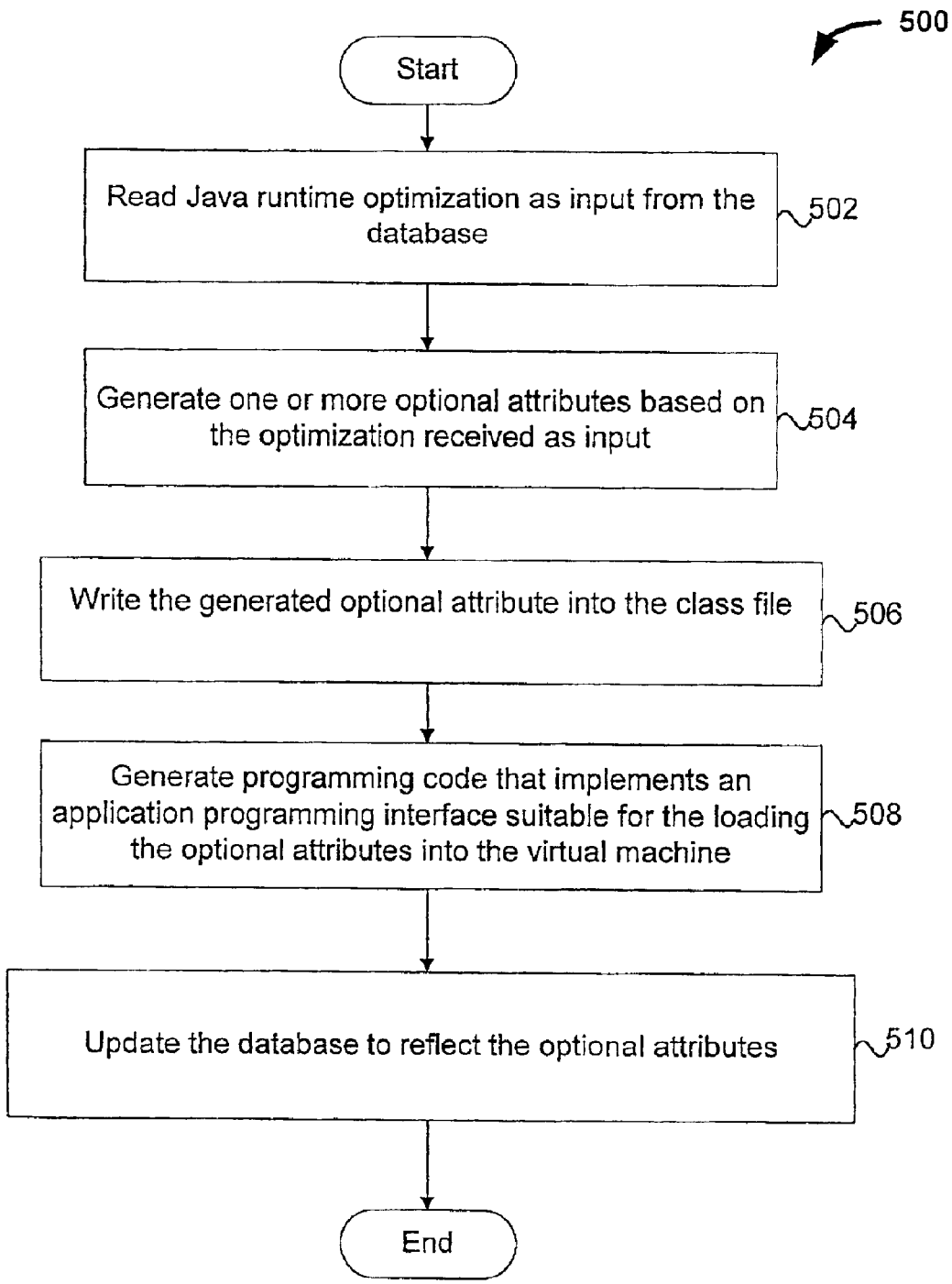
FIG. 5 illustrates a method for generating optional attributes in accordance with one embodiment of the invention.

FIG. 5 illustrates a method 500 for generating optional attributes in accordance with one embodiment of the invention. The method 500 can be used, for example, by the optional attributes generator 401 of FIG. 4. Initially, at operation 502, a Java runtime optimization is read from a database as input. Next, at operation 504, one or more optional attributes are generated based on the optimization. Thereafter, at operation 506, the one or more optional attributes are written into a class file that is to be loaded into the virtual machine. At operation 508, appropriate programming code that implements an Application Programming Interface (API) suitable for loading the optional attributes into the virtual machine is generated. Finally, at operation 510, the database is updated to reflect the generated optional attribute(s).

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. In a Java computing environment, a method of customizing a Java runtime environment for a Java class file which is executed by a virtual machine said method comprising:

reading a java class file, which includes a plurality of Bytecodes, prior to loading or executing the class file by the virtual machine;

analyzing said java class file, for one or more runtime attributes associated with runtime performance of the java class file, prior to loading or executing the class file by the virtual machine;

marking one or more Bytecodes of said class file, based on said analyzing of said class file, prior to loading or executing the class file by the virtual machine;

generating at least one runtime attribute for each one of said one or more marked Java Bytecodes prior to loading or executing the class file by the virtual machine;

reading by the virtual machine, during the load time of the class file into the virtual machine, the at least one runtime attribute for each one of said one or more marked Java Bytecodes;

loading by the virtual machine at least one runtime feature associated with the at least one runtime attribute prior to execution of said class file by the virtual machine; and executing said class file by said virtual machine in a runtime environment that includes the at least one runtime feature associated with the at least one runtime attribute, thereby allowing the runtime environment to be customized based on the analyzing, marking, and generating of the at least one runtime attribute.

2. A method as recited in claim 1, wherein said loading operates to load a feature only if said feature has an associated attribute.

3. A method as recited in claim 1, wherein said marking is performed by a Java compiler extension.

4. A method as recited in claim 1, wherein said marking is performed by a software tool suitable for analyzing runtime performance of a Java application associated with said Java class file in the runtime environment.

5. A method as recited in claim 1, wherein said one or more marked Java Bytecodes are associated with a Java method.

6. A method as recited in claim 5, wherein said one or more marked Java Bytecodes is associated with a Java object that has an attribute that is of interest.

7. A method as recited in claim 6, wherein said attribute is the life span, size, or class of said Java object.

8. A method as recited in claim 7, wherein said generating of said at least one attribute is performed by a software module that operates to generate said at least one attribute in an attributes table of said class file as the last attribute.

9. A Java computing environment, comprising: a virtual machine for executing a Java class file, wherein the virtual machine is capable of:

reading a java class file which includes a plurality of Bytecodes prior to loading or executing the class file by the virtual machine;

analyzing said Java class file, for one or more runtime attributes associated with runtime performance of the Java class file, prior to loading or executing the class file by the virtual machine;

marking one or more Bytecodes of said class file, based on said analyzing of said class file, prior to loading or executing the class file by the virtual machine;

generating at least one runtime attribute for each one of said one or more marked Java Bytecodes prior to loading or executing the class file by the virtual machine;

reading by the virtual machine, during the load time of the class file into the virtual machine, the at least one runtime attribute for each one of said one or more marked Java Bytecodes;

loading by the virtual machine at least one runtime feature associated with the at least one runtime attribute prior to execution of said class file by the virtual machine; and executing said class file by said virtual machine in a runtime environment that includes the at least one runtime feature associated with the at least one runtime attribute, thereby allowing the runtime environment to be customized based on the analyzing, marking, and generating of the at least one runtime attribute.

10. A Java computing environment as recited in claim 9, wherein a software module operates as a runtime performance manager and operates to ensures that said at least one feature is appropriately loaded into said virtual machine.

11. A Java computing environment as recited in claim 10, wherein said runtime performance manager includes a database that can be used as input by the second software module to generate said at least one attribute.

12. A Java computing environment as recited in claim 9, wherein a compiler extension or a software tool is utilized for analyzing said class file.

13. A computer readable media including computer program code for customizing a Java runtime environment for a Java class file which is executed by a virtual machine, said computer readable media comprising:

computer program code for reading a Java class file which includes a plurality of Bytecodes prior to loading or executing the class file by the virtual machine;

computer program code for analyzing said Java class file, for one or more runtime attributes associated with runtime performance of the Java class file, prior to loading or executing the class file by the virtual machine;

computer program code for marking one or more Bytecodes of said of class file, based on said analyzing of said class file, prior to loading or executing the class file by the virtual machine;

computer program code for loading at least one runtime attribute for each one of said one or more marked Java Bytecodes prior to loading or executing the class file by the virtual machine;

computer program code for providing by the virtual machine at least one runtime feature associated with the at least one runtime attribute prior to execution of said class file by the virtual machine; and computer program code for executing said class file by said virtual machine in a runtime environment that includes the at least one runtime feature associated with the at least one runtime attribute, thereby allowing the runtime environment to be customized based on the analyzing, marking, and generating of the at least one runtime attribute.

14. A computer readable media as recited in claim 13, wherein said computer program code for loading operates to load a feature only if said feature has an associated attribute.

15. A computer readable media as recited in claim 13, wherein said computer program code for marking is performed by a Java compiler extension.

16. A computer readable media as recited in claim 13, wherein said computer program code for marking is performed by a software tool suitable for analyzing performance of a Java application in the runtime environment.

17. A computer readable media as recited in claim 16, wherein said marked Java Bytecode is associated with a Java object that has an attribute that is of interest.

18. A computer readable media as recited in claim 17, wherein said attribute is the life span, size, or class of said Java object.

* * * * *

UNITED STATES PATENT AND TRADEMARK OFFICE
CERTIFICATE OF CORRECTION

PATENT NO. : 6,964,033 B2
DATED : November 8, 2005
INVENTOR(S) : Wallman et al.

It is certified that error appears in the above-identified patent and that said Letters Patent is hereby corrected as shown below:

<u>Title page,</u>
Item [54] Title, change "OBJECT BAND CUSTOMIZATION OF JAVA RUNTIME ENVIRONMENTS" to -- CUSTOMIZATION OF JAVA RUNTIME ENVIRONMENTS --.

<u>Column 8,</u>
Line 32, delete second instance of "of".

Signed and Sealed this

Thirteenth Day of June, 2006

JON W. DUDAS
*Director of the United States Patent and Trademark Office*